United States Patent [19]

Ferrari

[11] Patent Number: 4,609,524
[45] Date of Patent: Sep. 2, 1986

[54] NUCLEAR REACTOR COMPONENT RODS AND METHOD OF FORMING THE SAME

[75] Inventor: Harry M. Ferrari, Pittsburgh, Pa.

[73] Assignee: Westinghouse Electric Corp., Pittsburgh, Pa.

[21] Appl. No.: 552,227

[22] Filed: Nov. 16, 1983

[51] Int. Cl.$^4$ ................................................ G21C 3/00
[52] U.S. Cl. .................................... 376/417; 376/416; 376/418
[58] Field of Search ........................ 376/416, 417, 418

[56]  References Cited
U.S. PATENT DOCUMENTS 4,123,326  10/1978  Shinbo .................................. 376/418
4,279,700   7/1981  Boyle .................................... 376/418

Primary Examiner—Donald P. Walsh
Attorney, Agent, or Firm—John J. Prizzi

[57] ABSTRACT

A nuclear reactor component such as a fuel rod, burnable absorber rod, or neutron absorber rod, comprising a hermetically sealed metallic tube containing a solid material such as a nuclear fuel, burnable absorber, or neutron absorber, within a helium atmosphere, which solid material will release tritium into the helium atmosphere, has added thereto about 2-3 percent by volume of a gas, selected from oxygen, carbon monoxide and carbon dioxide. The addition of this gas to the helium atmosphere is effective to form an oxide layer on the inner surface of the metallic tube and significantly reduce the permeation of tritium through the metallic tube, such that the tritium is retained within the reactor component.

21 Claims, 2 Drawing Figures

NUCLEAR REACTOR COMPONENT RODS AND METHOD OF FORMING THE SAME

BACKGROUND OF THE INVENTION

In nuclear reactor systems, a number of the components, such as nuclear fuel rods, burnable absorber rods and control rods, are formed of metallic tubes or cladding. These metallic tubes contain solid materials such as nuclear fuel, a burnable absorber, and neutron absorbers, within a helium atmosphere in the hermetically sealed cladding, which solid materials form tritium during operation of the reactor. Such tritium is formed during reactor operation by ternary fissioning of uranium in fuel rods, or by nuclear reactions with boron in the burnable absorber rods or control rods.

Although these rods are hermetically sealed, tritium can diffuse through the cladding at reactor operating conditions, especially through a stainless steel cladding, and can pose a health hazard. It is thus desirable to contain the tritium hermetically sealed within the fuel rod, burnable absorber rod or control rod.

In U.S. Pat. No. 4,100,020 there is described a fuel pin which contains a solid oxidizing chemical, such as oxides of a transition metal, which will radiolytically and thermally decompose to release oxidizing chemicals or free oxygen to the interior of the pin so as to form zirconium dioxide on the inner walls of the zirconium alloy from which the pin is made. Such solid materials may be added as separate pellets, in addition to the fuel pellets in the pin, or as an oxidizing chemical in the form of a coating on the inner wall of the pin. The purpose of the addition of the solid oxidizing chemical is to form an oxide coating on the cladding to replace failure of an initial oxide coating thereon by abrasion or the like, to prevent attack by fission products which could cause stress corrosion cracking and possible perforation of the cladding.

SUMMARY OF THE INVENTION

Nuclear reactor components in the form of hermetically sealed metallic tubes, such as fuel rods, burnable absorber rods, and control rods, which contain a helium atmosphere and a solid material which will release tritium into the helium atmosphere, have added to the helium atmosphere a minor amount of a gas selected from oxygen, carbon monoxide, and carbon dioxide. The addition of the minor amount of gas, about 2-3 percent by volume, to the helium atmosphere provides for formation of an oxide coating on the inner walls of the metallic tube, during operation of the reactor, and reduces the permeation of tritium through the walls of the metallic tube and containment thereof within the tube. The metallic tubes may be formed of stainless steel, a zirconium alloy or a nickel based alloy; while the tube may contain nuclear fuel, optionally with a burnable absorber, the tube may also contain a burnable absorber or a neutron absorber without nucler fuel;

BRIEF DESCRIPTION OF THE DRAWINGS

In the drawings, which illustrate the present invention in the form of a nuclear fuel rod.

DETAILED DESCRIPTION

Figure 1:
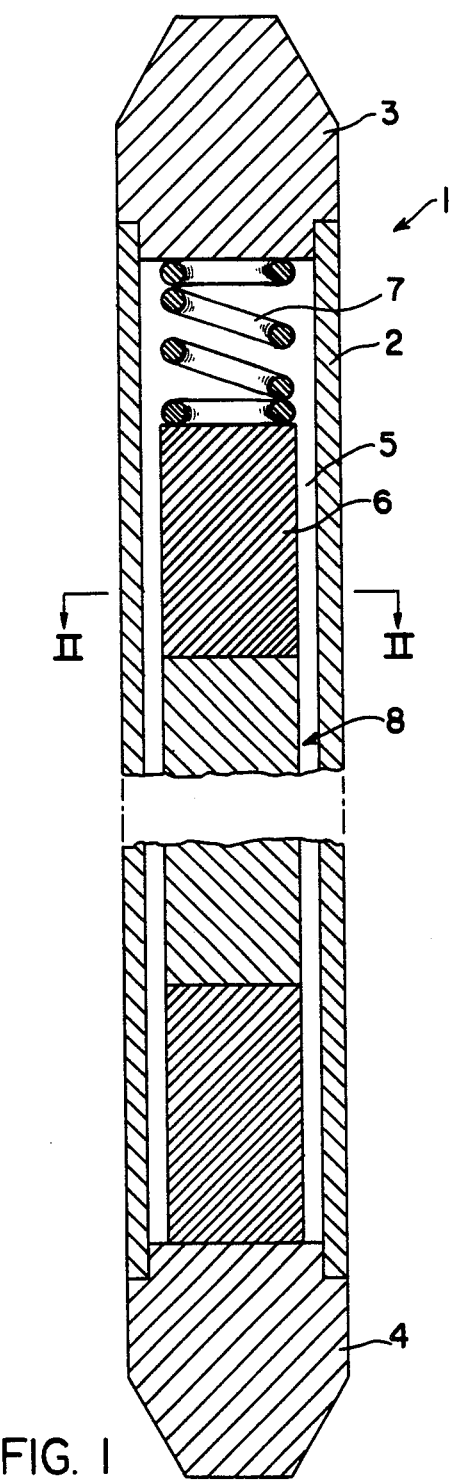
FIG. 1 is a longitudinal sectional view of a fuel rod, containing a plurality of uranium dioxide pellets, constructed according to the present invention.
Figure 2:
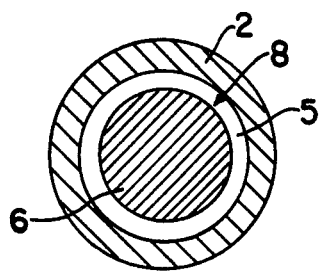
FIG. 2 is a transverse sectional view taken along the lines II—II of FIG. 1.

The nuclear reactor components of the present invention, which include fuel rods, burnable absorber rods, and control rods all comprise a metallic tube or cladding which contains a solid material that will release tritium during operation of the nuclear reactor, and all are hermetically sealed with a helium atmosphere also contained within the cladding. The addition of a minor amount of a gas such as oxygen, carbon monoxide or carbon dioxide to the helium atmosphere will cause formation of an oxide coating on the inner surface of the metallic tube and reduce permeation of tritium through the tube.

As an illustration of an embodiment of the present invention, reference is made to the drawings wherein a fuel rod constructed according to the present invention is illustrated. The fuel rod 1 for use in a nuclear reactor fuel assembly comprises an elongated metallic tube, or cladding, 2 having a top end plug 3 and a bottom end plug 4 that forms a closed chamber 5. Solid nuclear fuel pellets 6 are placed into the chamber 5 and are biased against the bottom end plug 4 by a spring 7. The nuclear fuel pellets 6 are of a diameter slightly less than the interior diameter of the metallic tube 2 and the chamber 5 is filled with a helium atmosphere 8, the helium atmosphere being hermetically sealed within the metallic tube 2.

In accordance with the present invention, there is added to the helium atmosphere, a minor amount, preferably 2-3 percent by volume, of a gas selected from oxygen, carbon monoxide and carbon dioxide. This gas, during operation of the reactor system in which the fuel rod is placed, will form an oxide coating on the interior surface of the cladding and reduce the permeability of the cladding to tritium.

The metallic tube 2 may comprise stainless steel or a zirconium alloy, such as Zircaloy, while the solid nuclear fuel pellets comprise uranium dioxide or a mixed uranium-plutonium dioxide. In some instances, the fuel rod 1 may also contain a burnable absorber such as boron, which burnable absorber may be mixed with the nuclear fuel pellets or coated thereon.

While the drawing shows a fuel rod for purposes of illustrating the present invention, it is to be understood that the present invention is also applicable to burnable absorber rods and neutron absorber rods.

The use of the present invention in connection with fuel rods, burnable absorber rods and neutron absorber rods will provide a significant reduction of tritium permeability through the metal cladding of the rods. It is expected that, for example, the use of the present invention in stainless steel cladded fuel rods, where the rods are operated over a three year period, the metal clad of the rod having an outside diameter of 0.412 inches, with a thickness of the metal clad of 0.0165 inches, and with a formation of an oxide from the gas added to the helium, that will produce an oxide film on the inner surface of the cladding having a thickness of 2 microns, the tritium released through the clad, as compared with a clad having no oxide layer thereon would be:

| Operating Temperature (°F.) | Tritium Released Through Clad (percent) | |
|---|---|---|
| | No Oxide Layer | Oxide Layer |
| 600 | 98 | 4 |

-continued

| Operating Temperature (°F.) | Tritium Released Through Clad (percent) | |
| --- | --- | --- |
| | No Oxide Layer | Oxide Layer |
| 700 | 99 | 7 |

While the reduction in tritium release will depend, to an extent, upon factors such as the clad material, clad temperature and time, the continuous formation and maintenance of an oxide layer by the gas added to the helium atmosphere will be very effective in reducing the rate of tritium permeation through the cladding.

In the operation of the nuclear reactor systems, the temperature of the cladding of the various rod components will generally be in the range of about 600°-700° F., in pressurized water reactors and boiling water reactors, while temperatures on the order of about 1000° F. would be reached in liquid metal reactors.

The gas added to the helium atmosphere, selected from oxygen, carbon monoxide and carbon dioxide is added in a minor amount effective to form an oxide coating on the inner surface of the cladding. An amount of 2-3 percent by volume based on the volume of the helium, is prefered, and may be added to the nuclear reactor component rod in admixture with the helium atmosphere, or as a separate addition to the chamber of the rod, prior to sealing of the tube. Use of a gaseous constituent in formation of an oxide coating enables easy regulating of the amount added and does not diminish the space available for solid fuel pellets, burnable absorbers, or neutron absorbers in the chamber within the rod.

In addition to the fuel rod described above, the present invention is usable in other nuclear reactor components such as burnable absorber rods and control rods. The burnable absorber rods normally comprise a stainless steel or zirconium alloy cladding containing a solid burnable absorber such as boron carbide ($B_4C$), or other boron-containing material, within a helium atmosphere sealed within the cladding. The control rods normally comprise a stainless steel or nickel alloy cladding containing a solid neutron absorber. The solid neutron absorber is usually a boron-containing material such as boron carbide, a silver-indium-cadmium alloy, or hafnium, or a combination of these, with a helium atmosphere sealed within the cladding.

The addition of 2-3 percent of a gas selected from oxygen, carbon monoxide and carbon monoxide to the atmosphere within the burnable absorber rods and control rods will also reduce the release of tritium from these rods during operation of the nuclear reactor system.

I claim:

1. In a nuclear reactor component comprising a hermetically sealed metallic tube, containing a helium atmosphere and a solid material which will release tritium into said helium atmosphere during operation of the nuclear reactor; the improvement wherein said helium atmosphere has added thereto a gas selected from the group consisting of oxygen, carbon monoxide and carbon dioxide, in a minor amount effective to form an oxide layer on the inner surface of the metallic tube, to reduce permeation of tritium through said metallic tube.

2. A nuclear reactor component as defined in claim 1 wherein said gas is carbon dioxide.

3. A nuclear reactor component as defined in claim 1 wherein said component is a fuel rod comprising a hermetically sealed metallic tube containing a nuclear fuel as said solid material.

4. A nuclear reactor component as defined in claim 3 wherein said nuclear fuel is selected from the group consisting of uranium dioxide and a mixture thereof with plutonium dioxide.

5. A nuclear reactor component as defined in claim 3 wherein said solid material also contains a burnable absorber.

6. A nuclear reactor component as defined in claim 3 wherein said metallic tube is comprised of a metal selected from stainless steel and a zirconium alloy.

7. A nuclear reactor component as defined in claim 1 wherein said component is a burnable absorber rod comprising a hermetically sealed metallic tube containing a burnable absorber as said solid material.

8. A nuclear reactor component as defined in claim 7 wherein said burnable absorber is a boron-containing material.

9. A nuclear reactor component as defined in claim 7 wherein said metallic tube is comprised of stainless steel.

10. A nuclear reactor component as defined in claim 7 wherein said metallic tube is comprised of a zirconium alloy.

11. A nuclear reactor component as defined in claim 7 wherein said gas is carbon dioxide.

12. A nuclear reactor component as defined in claim 1 wherein said component is a control rod comprising a hermetically sealed metallic tube containing a neutron absorber material as said solid material.

13. A nuclear reactor component as defined in claim 12 wherein said metallic tube is comprised of stainless steel.

14. A nuclear reactor component as defined in claim 12 wherein said metallic tube is comprised of a nickel based steel alloy.

15. A nuclear reactor component as defined in claim 12 wherein said neutron absorber is selected from the group consisting of $B_4C$, a silver-indium-cadmium alloy, and hafnium.

16. In a method for forming nuclear reactor components comprising a hermetically sealed metallic tube containing a solid material which will release tritium during operation of the nuclear reactor into which the component is placed, and wherein a helium atmosphere is added to the metallic tube and surrounds the solid material therein, the improvement comprising adding to said helium atmosphere a gas selected from the group consisting of oxygen, carbon monoxide and carbon dioxide, in an amount effective to form an oxide layer on the inner surface of the metallic tube, to reduce permeation of tritium through said metallic tube.

17. The method as defined in claim 16 wherein said component is a fuel rod comprising a hermetically sealed metallic tube containing a nuclear fuel as said solid material.

18. The method as defined in claim 16 wherein said component is a burnable absorber rod comprising a hermetically sealed metallic tube containing a burnable absorber as said solid material.

19. The method as defined in claim 16 wherein said component is a control rod comprising a hermetically sealed metallic tube containing a neutron absorber as said solid material.

20. The method as defined in claim 16 wherein said gas is added to said metallic tube in admixture with said helium atmosphere.

21. The method as defined in claim 16 wherein said gas is added to the helium atmosphere within said metallic tube as a separate addition to the chamber prior to sealing of the tube.

* * * * *